(12) United States Patent  
Simila

(10) Patent No.: US 9,100,991 B2  
(45) Date of Patent: Aug. 4, 2015

(54) ERGONOMIC ARMRESTS FOR USE WITH HOTPLATE

(71) Applicant: Raytheon Company, Waltham, MA (US)

(72) Inventor: Charles E. Simila, Richardson, TX (US)

(73) Assignee: Raytheon Company, Waltham, MA (US)

( * ) Notice: Subject to any disclaimer, the term of this patent is extended or adjusted under 35 U.S.C. 154(b) by 349 days.

(21) Appl. No.: 13/764,450

(22) Filed: Feb. 11, 2013

(65) Prior Publication Data

US 2014/0224781 A1  Aug. 14, 2014

(51) Int. Cl.
| | |
|---|---|
| *H05B 1/00* | (2006.01) |
| *B68G 5/00* | (2006.01) |
| *B32B 7/12* | (2006.01) |
| *B32B 15/14* | (2006.01) |

(52) U.S. Cl.
CPC .. *H05B 1/00* (2013.01); *B32B 7/12* (2013.01); *B32B 15/14* (2013.01); *B68G 5/00* (2013.01); *B32B 2262/105* (2013.01); *B32B 2307/21* (2013.01); *B32B 2307/304* (2013.01); *B32B 2571/00* (2013.01)

(58) Field of Classification Search  
None  
See application file for complete search history.

(56) References Cited

U.S. PATENT DOCUMENTS

| | | | |
|---|---|---|---|
| 6,089,167 | A | 7/2000 | Frohardt |
| 2004/0051082 | A1 | 3/2004 | Child et al. |

FOREIGN PATENT DOCUMENTS

GB  2478962 A  9/2011

OTHER PUBLICATIONS

Notification of Transmittal of the International Search Report and the Written Opinion of the International Searching Authority, or the Declaration dated Jun. 13, 2014 in connection with International Patent Application No. PCT/US2013/074409.

*Primary Examiner* — Shawntina Fuqua

(57) ABSTRACT

An ergonomic armrest includes an outer surface layer formed of a pliable electrostatic discharge (ESD)-safe material. The ergonomic armrest also includes a first metal layer configured to structurally support the outer surface layer and transfer heat from a first edge of the ergonomic armrest proximate to a heat source to a second edge of the ergonomic armrest opposite the heat source. The ergonomic armrest further includes an insulating layer configured to reduce heat transfer from the heat source to the first metal layer.

21 Claims, 4 Drawing Sheets

ERGONOMIC ARMRESTS FOR USE WITH HOTPLATE

TECHNICAL FIELD

This disclosure is generally directed to ergonomics in industrial applications. More specifically, this disclosure is directed to ergonomic armrests for use with an industrial hotplate.

BACKGROUND

Hotplates are used in many industrial applications. For example, hotplates are used during the course of manual assembly or rework operations performed on electronic and electro-mechanical devices. Many hotplates used in industrial applications have inadequate protections and ergonomic features for the user. For example, some commercial hotplates have work surfaces that are several inches above the surrounding table top. This causes a user to hold his or her forearms up, with elbows off the table, for an extended period of time, thereby increasing the risk of stress injuries. Likewise, some hotplates lack adequate thermal protection and protection from electrostatic discharge (ESD).

SUMMARY

This disclosure provides an ergonomic armrest and an assembly thereof.

In a first embodiment, an ergonomic armrest is provided. The ergonomic armrest includes an outer surface layer formed of a pliable electrostatic discharge (ESD)-safe material. The ergonomic armrest also includes a first metal layer configured to structurally support the outer surface layer and transfer heat from a first edge of the ergonomic armrest proximate to a heat source to a second edge of the ergonomic armrest opposite the heat source. The ergonomic armrest further includes an insulating layer configured to reduce heat transfer from the heat source to the first metal layer.

In a second embodiment, an ergonomic armrest assembly is provided. The ergonomic armrest assembly includes a front ergonomic armrest configured to be positioned adjacent to a front edge of a heat source, and at least one side ergonomic armrest configured to be positioned adjacent to a side edge of the heat source. Each of the ergonomic armrests includes an outer surface layer formed of a pliable ESD-safe material, a first metal layer configured to structurally support the outer surface layer and transfer heat from a first edge of the ergonomic armrest proximate to a heat source to a second edge of the ergonomic armrest opposite the heat source, and an insulating layer configured to reduce heat transfer from the heat source to the first metal layer.

In a third embodiment, an ergonomic hotplate workstation is provided. The ergonomic hotplate workstation includes a hotplate and an ergonomic hotplate armrest disposed on a plurality of sides of the hotplate. Each of the plurality of ergonomic hotplate armrests includes an outer surface layer formed of a pliable ESD-safe material, a first metal layer configured to structurally support the outer surface layer and transfer heat from a first edge of the ergonomic armrest proximate to the hotplate to a second edge of the ergonomic armrest opposite the hotplate, and an insulating layer configured to reduce heat transfer from the hotplate to the first metal layer.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
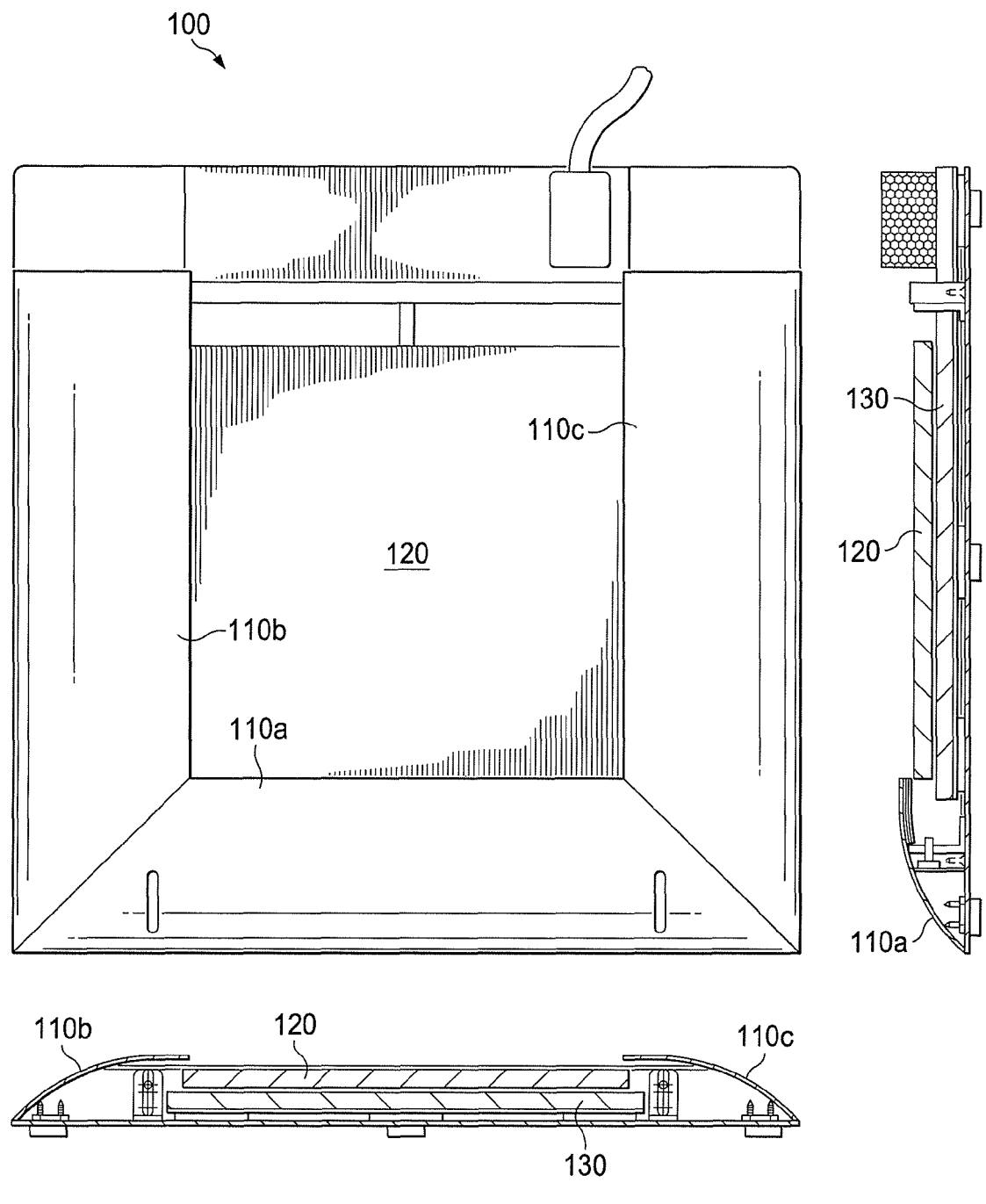
FIG. 1 illustrates a top view and front and side cross-section views of an ergonomic hotplate armrest assembly, according to an embodiment of this disclosure.

FIGS. 1 through 3B, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Embodiments of this disclosure provide an assembly of one or more protective ergonomic armrests attached to one or more sides of a hotplate, which may be used during the course of assembly or process operations related to the manufacture or rework of electronic and electro-mechanical devices.

Hotplates are used during the course of manual assembly or rework operations performed on electronic and electro-mechanical devices. Many hotplates lack useful design features that provide benefits to production items and users. For example, many hotplates offer little or no protection against: (i) electrostatic discharge (ESD) damage, (ii) minimization of foreign object debris (FOD) damage, (iii) thermal protection to limit armrest to comfortable temperature, (iv) protection against operator fatigue and ergonomic injuries, and (v) chemical resistance to common solvents.

Some hotplates use non-ergonomic, box-like enclosures typically formed of phenolic plates and covered with conductive foam materials. The enclosures lack design features to promote convection cooling. Due to the low continuous temperature tolerance for phenolic resins, the phenolic and conductive foam materials may experience physical degradation in use and become FOD sources. Additionally, some hotplates are four to six inches tall, which leads to repeated-stress injuries due to upper-arm adduction and excessive wrist flexure. Use of phenolic materials is now constrained due to OSHA and EHS limitations.

In contrast, certain embodiments of the hotplate and ergonomic armrests disclosed herein provide a very low work surface. In such embodiments, operators can work over the hotplate without straining to lift their shoulders and arms unnaturally high. Additionally, in certain embodiments, the hotplate armrests are rounded and low, with no sharp corners under the operator's arms. Thus, there is no need for excessive wrist flexure to reach a part on the hotplate surface. Moreover, in certain embodiments, the size of each hotplate armrest is such that the fleshy portion of the forearm between the wrist and the ulnar nerve can comfortably rest on the armrest. In particular configuration, the air-cooled armrests are designed to not exceed 40° C. (slightly over body temperature) when the hotplate is running at 200° C. According to certain embodiments, all materials in the armrests are ESD-safe, low FOD generators, and resistant to common solvents. The design of the armrests is applicable to any manufacturing or lab work in any industry where personnel must work on a heated surface.

Embodiments of the ergonomic hotplate armrests disclosed herein provide a number of advantageous benefits. For example, according to certain embodiments, the disclosed ergonomic armrests use an ESD-safe material, allowing work on electronic products subject to 100-volt withstand-voltage-sensitivity and mandatory exclusion of static charge generators over 100 volts. Use of air ionizers is not needed, thus avoiding adverse solder-process effects due to moving air. The ergonomic design of the disclosed ergonomic armrests provides protection against thermal or ergonomic injury for operators who continuously perform soldering or rework on heated production items, which, in many cases, are located under a stereo microscope in an ISO 14644 class 8 or better cleanroom.

The disclosed ergonomic armrests in certain embodiments are configured to be used with a much lower hotplate. For example, in some embodiments, the ergonomic armrests are used with a hotplate that has an approximately 1.2 inch height, with ceramic insulation in the hotplate body and thermal spreading in the ergonomic armrest. The low work surface allows operators working under a stereo microscope to maintain upper arm position close to the body, work with minimal wrist flexure in both hands, and keep their head in a low-stress orientation.

FIG. 1 illustrates a top view and front and side cross-section views of an ergonomic hotplate armrest assembly, according to an embodiment of this disclosure. The embodiment of the ergonomic hotplate armrest assembly 100 illustrated in FIG. 1 is for illustration only. Other embodiments could be used without departing from the scope of this disclosure.

The ergonomic hotplate armrest assembly 100 includes a front ergonomic armrest 110a and two side ergonomic armrests 110b, 110c (which may be collectively referred to as "the armrests 110"). The armrests 110 surround three sides of a hotplate 120 that is situated on a support box 130.

The ergonomic armrests 110 are attached to the support box 130 for the hotplate 120 by use of commercially available or custom mechanical devices or metal frame structures, which may be fixed or adjustable. The structures may form a part of the hotplate 120 used in conjunction with the armrest assembly 100, or the armrest assembly 100 may be configured to be used as an accessory to the hotplate 120, whether attached to the hotplate 120 or not.

One or more of the ergonomic armrests 110 may be attached to the frame structures in the fashion of a door or flipper, or may be otherwise removable. The armrest assembly 100 may be adjustable in height to accommodate work on productive items of various heights, or work on productive items attached to fixtures of various heights.

Each ergonomic armrest 110 is constructed of layers assembled into a laminate structure with a convex curvature selected for compatibility with the upper-body structure of the most prevalent population of assembly operators. The curvature of the armrests 110 provides comfort against an operator's forearm while minimizing potential injuries (e.g., carpal tunnel, nerve compression, excessive wrist flexure, shoulder muscle adduction, and the like). The ergonomic armrests 110 are formed of durable materials, as explained in greater detail below. Accordingly, the ergonomic hotplate armrest assembly 100 can be expected to provide a minimum ten-year service life, which may be extended by refurbishment of the non-metallic materials. The outer surface of the ergonomic armrests 110 is formed of materials that may be wiped with common solvents for cleanliness in a cleanroom environment. The outer surface materials are also treated to prevent FOD generation.

The ergonomic armrest assembly 100 features an air-cooled armrest design with ceramic insulation, which allows operators to work continuously at the hotplate 120 with their arms on the armrests 110. Each ergonomic armrest 110 dissipates heat laterally within a thermally conductive layer placed immediately under the surface where the operator rests his or her arms. Due to the presence of thermal masking, heat is transported laterally to a convection-cooled location faster than the heat can flow upward through the ESD-safe armrest surface. Thus, cooling occurs faster than the thermal energy can be received at the inboard edge of the heat spreader, which is in close proximity to the surface of the hotplate 120.

Additionally, each armrest 110 features a reduced area of exposure at the inboard edge of the heat spreader, which is heated by the hotplate 120. This is provided by masking the underside of the heat spreader in proximity to the hotplate 120 using a low-thermal-conductivity material, which is coated with a conductive adhesive to minimize FOD generation and to preserve ESD conductive or static-dissipative qualities. The insulative material is further protected mechanically by a thin metal layer with low heat transfer capacity in comparison to the heat transfer capacity of the heat spreader layer.

The hotplate 120 features a low surface height that is achieved by use of ceramic mat insulation inside the hotplate support box 130, combined with thermal-spreader and convection-cooling design features in the ergonomic armrest assembly 100. In contrast, many commercial hotplates typically use lower-temperature-rated insulation, and must have taller support boxes under the heated plate for air cooling, and to prevent excess heat transfer to the workbench surface under the hotplate.

Although FIG. 1 illustrates one example of the ergonomic hotplate armrest assembly 100, various changes may be made to FIG. 1. For example, the ergonomic armrest assembly 100 may include more or fewer armrests 110, and the armrests 110 may be arranged in different positions.

Figure 2:
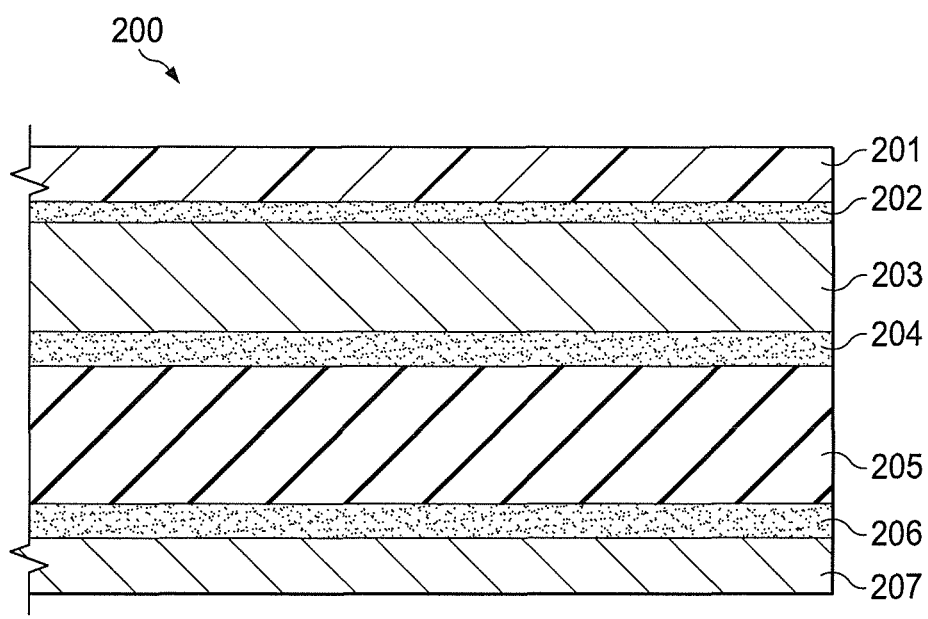
FIG. 2 illustrates a partial cross section view of the layers of an ergonomic hotplate armrest, according to an embodiment of this disclosure.

FIG. 2 illustrates a partial cross section view of the layers of an ergonomic hotplate armrest, according to an embodiment of this disclosure. Although certain details will be provided with reference to the layers of the ergonomic hotplate armrest 200 of FIG. 2, it should be understood that other embodiments may include more, fewer, or different components. The ergonomic hotplate armrest 200 may represent one or more of the ergonomic hotplate armrests 110 of FIG. 1. The ergonomic hotplate armrest 200 includes seven layers 201-207, which will now be described from the outer surface layer to the innermost layer.

Layer 201 is the surface layer of the hotplate armrest 200, upon which the operator rests his or her arm. The surface layer 201 is formed of a pliable ESD-safe material, such as a nitrile ESD-mat material. The flexible, pliable surface layer 201 provides a soft, comfortable surface for the operator's forearms. The surface layer 201 exhibits static-conductive or static-dissipative qualities (e.g., a surface resistivity less than $1.0 \times 10^9$ Ohms/Square) and low thermal conductivity (e.g., a thermal conductivity of <1 W/m K). In some embodiments, the surface layer 201 may have a reduced continuous temperature withstanding capability (e.g., $\leq 80°$ C.) compared to the surface temperature of the operating hotplate (i.e., $\leq 200°$ C.).

Layer 202 is a layer of conductive RTV (room temperature vulcanizing) adhesive that provides an electrical bond or connection from the electrically conductive back side of the surface layer 201 to the metal layer 203. The adhesive layer 202 exhibits electrically conductive properties (i.e., volume resistivity of approximately 5 Ohm-cm), which provides ESD dissipative qualities for the system.

Layer 203 is a structural layer formed of a metal with good thermal transfer characteristics. For example, the metal layer 203 may be formed of aluminum, which exhibits a thermal conductivity of 250 Watts/meter Kelvin. In some embodiments, the metal layer 203 is approximately 3.2 mm thick. The metal layer 203 is a structurally supportive layer that helps to provide the armrest 200 with its curved shape. The thermally conductive metal layer 203 functions as a thermal spreader, transferring heat from the edge of the armrest 200 proximate to the hotplate toward the outer edge of the armrest 200. Cooling of the armrest 200 occurs by convection cooling due to room temperature air drawn under the lower edge of the armrest 200. This helps to ensure that the air-cooled armrest 200 does not exceed 40° C. The length and width of each armrest segment in the metal layer 203 is very similar to the dimensions of the surface layer 201.

Layer 204 is a second layer of electrically conductive RTV adhesive. In some embodiments, the adhesive layer 204 may be the same material as the adhesive layer 202. In other embodiments, the adhesive layer 204 may be a different electrically conductive RTV adhesive material. The adhesive layer 204 provides an electrical bond between the metal layer 203 and the insulating layer 205.

Layer 205 is formed of a thermally and electrically insulative material. For example, the insulating layer 205 may be formed of alumina-silicate ceramic non-woven insulation, having a thermal conductivity of approximately 0.22 to 0.32 Watts/meter Kelvin. In an embodiment, the insulating layer 205 may be approximately 3 mm thick. The insulating layer 205 reduces heat transfer from the hotplate to the metal heat spreader layer 203. The insulating layer 205 may not extend completely across the width of the armrest 200. For example, the insulating layer 205 may extend across less than 50% of the armrest width. Exposed insulation edges are coated with the same electrically conductive RTV used in the adhesive layers 202, 204, 206. This coating serves to bond and encapsulate the insulation fibers to minimize FOD generation, and to minimize potential exposure of personnel to the insulative material.

Layer 206 is a third layer of electrically conductive RTV adhesive. In some embodiments, the adhesive layer 206 may be the same material as the adhesive layers 202, 204. In other embodiments, the adhesive layer 206 may be a different electrically conductive RTV adhesive material. The adhesive layer 206 provides an electrical bond between the insulating layer 205 and the metal layer 207.

Layer 207 is a thin metal layer that provides protection for the insulation material of the insulating layer 205. The metal layer 207 is formed of the same metal as the metal layer 203 or another metal with good thermal transfer characteristics, and is used to transport heat from the hotplate outward to the convection-cooled zone under the outer edge of the armrest 200. The metal layer 207 is attached to the metal layer 203 using small-diameter mechanical fasteners (e.g., 2-56 screws, or rivets of similar diameter). In an embodiment, the thickness of the metal layer 207 is approximately 1.6 mm, and the length for each armrest segment is very similar to the dimensions of the surface layer 201. The width for each armrest segment of the metal layer 207 may be approximately 50% or less of the width of the surface layer 201, to allow exposure of the surface layer 201 material for necessary convection cooling to occur.

In an embodiment, the inboard edges of the layers 201-207 are aligned vertically.

The ergonomic armrest 200 is comprised of a combination of materials that would not be used independently. For example, if used alone, the metal heat spreader layer 203 would quickly heat the outer surface of the armrest 200 above the 70° C. human pain threshold. If used alone, the ESD-safe surface layer 201 would exceed its 80° C. continuous-use temperature, with subsequent degradation of the material. If used alone, the conductive RTV adhesive layers 202, 204, 206 and ceramic mat insulating layer 205 could not maintain a rigid structure. When combined in a well-designed structure, these materials provide a long service life, which may be extended by refurbishment of the non-metallic layers.

Although FIG. 2 illustrates one example of a cross section of the layers of the ergonomic hotplate armrest 200, various changes may be made to FIG. 2. For example, the layers of the ergonomic hotplate armrest 200 shown in FIG. 2 may overlap, occur in a different order, occur in parallel, or occur multiple times. Moreover, some layers could be combined or removed, and additional layers could be added.

Figure 3A:
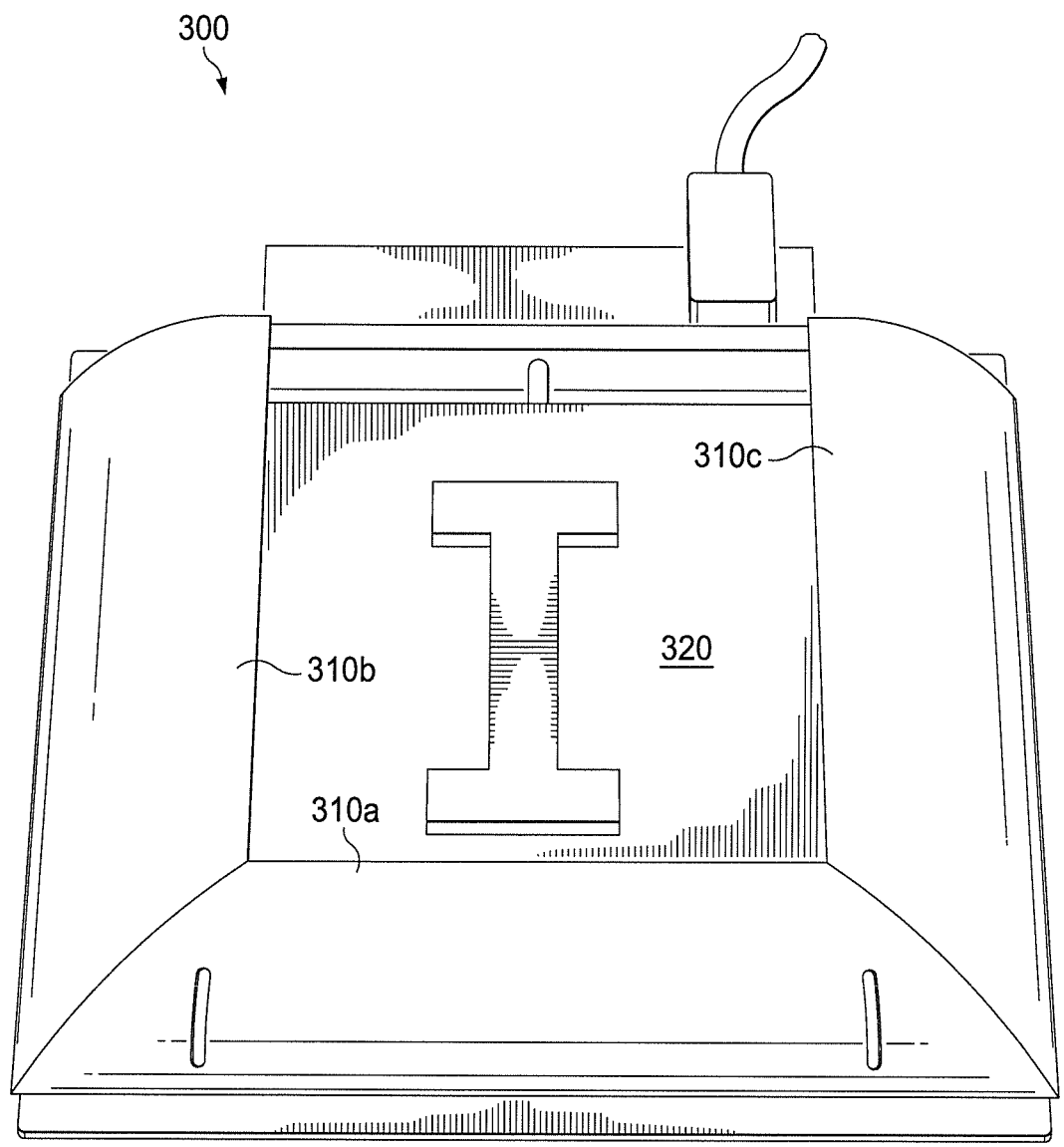
FIGS. 3A and 3B depict two views of an industrial application of an ergonomic hotplate armrest assembly, according to an embodiment of this disclosure.
Figure 3B:
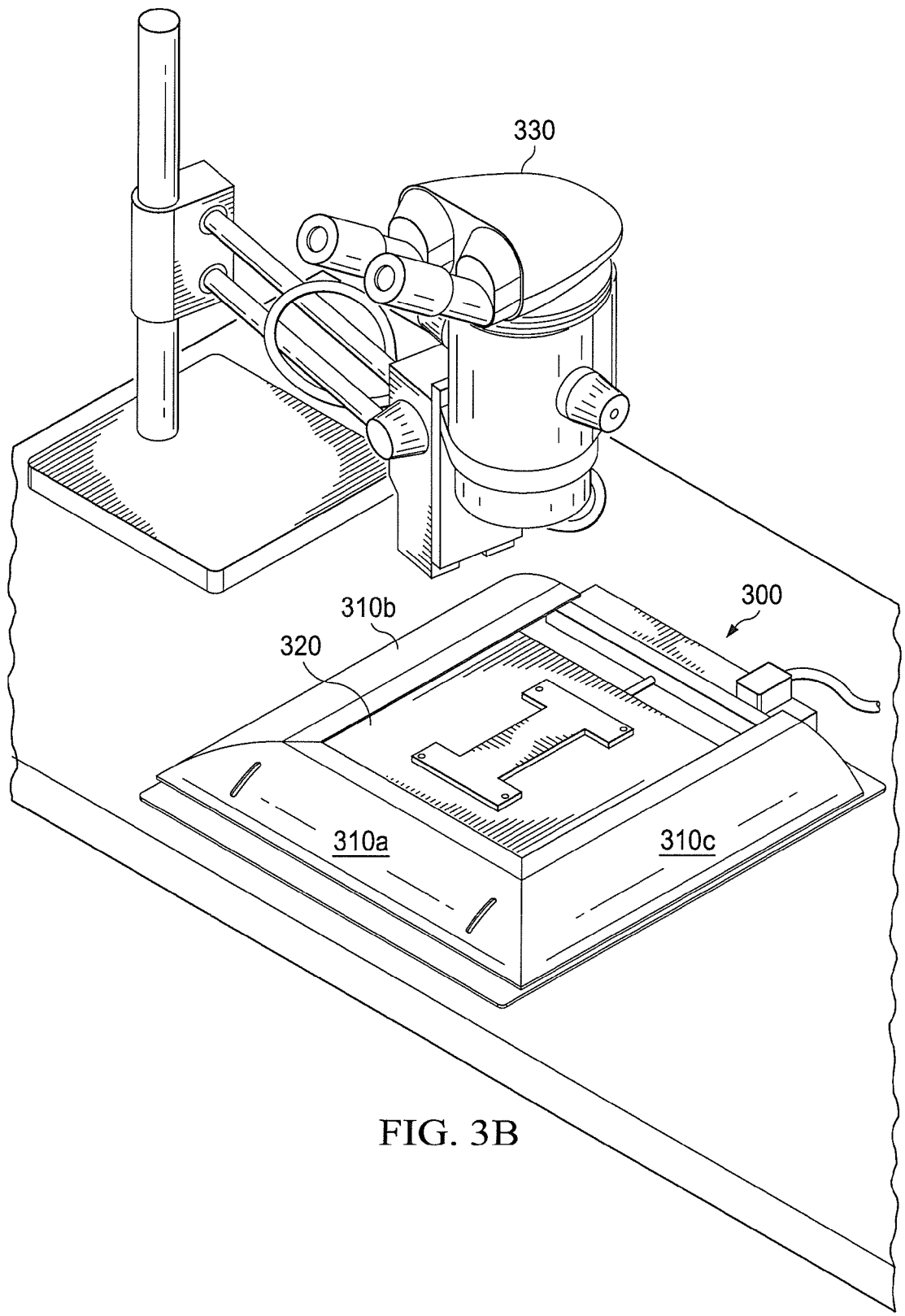

FIGS. 3A and 3B depict two views of an industrial application of an ergonomic hotplate armrest assembly, according to an embodiment of this disclosure. The embodiment of the ergonomic armrest assembly 300 illustrated in FIGS. 3A and 3B is for illustration only. Other embodiments could be used without departing from the scope of this disclosure. The ergonomic armrest assembly 300 may represent the ergonomic armrest assembly 100 of FIG. 1.

Like the armrest assembly 100, the armrest assembly 300 includes a front ergonomic armrest 310a and two side ergonomic armrests 310b, 310c (which may be collectively referred to as "the armrests 310"). The armrests 310 surround three sides of a hotplate 320. Above the hotplate 320 and the armrest assembly 300 is a stereo microscope 330. As an operator operates the hotplate 320 and the stereo microscope 330, the operator may rest his or arms on the armrests 310, thereby maintaining an upper arm position close to the body with minimal wrist flexure, and maintain the head in a low-stress orientation.

Although FIG. 3A and 3B illustrate an example industrial application of the ergonomic hotplate armrest assembly 300, various changes may be made to FIGS. 3A and 3B. For example, the ergonomic armrest assembly 300 may include more or fewer armrests 310, and the armrests 310 may be arranged in different positions.

Embodiments of the ergonomic hotplate armrests disclosed herein include a number some, none, or all of the following advantageous benefits: (i) protection against damage to productive items from electro-static discharge, (ii) minimization of damage to productive items caused by foreign object debris, (iii) thermal protection for the operator when the hotplate is operated at a surface temperature of ≤200° C., (iv) ergonomic design to minimize potential injuries to operators using the hotplate, and (v) chemical resistance to common solvents.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An ergonomic armrest, comprising:
   an outer surface layer formed of a pliable electrostatic discharge (ESD)-safe material;
   a first metal layer configured to structurally support the outer surface layer and transfer heat from a first edge of the ergonomic armrest proximate to a heat source to a second edge of the ergonomic armrest opposite the heat source; and
   an insulating layer configured to reduce heat transfer from the heat source to the first metal layer.

2. The ergonomic armrest of claim 1, further comprising:
   a second metal layer disposed on a side of the insulating layer opposite the first metal layer, the second metal layer configured to protect the insulating layer.

3. The ergonomic armrest of claim 2, further comprising:
   a first adhesive layer disposed between the outer surface layer and the first metal layer;
   a second adhesive layer disposed between the first metal layer and the insulating layer; and
   a third adhesive layer disposed between the insulating layer and the second metal layer.

4. The ergonomic armrest of claim 3, wherein at least one of the adhesive layers comprises an electrically conductive RTV (room temperature vulcanizing) adhesive configured to provide an electrical connection between its adjacent layers.

5. The ergonomic armrest of claim 3, wherein an order of the layers of the ergonomic armrest is the outer surface layer, the first adhesive layer, the first metal layer, the second adhesive layer, the insulating layer, the third adhesive layer, and the second metal layer.

6. The ergonomic armrest of claim 1, wherein a width of the insulating layer is less than 50% of a width of the outer surface layer.

7. The ergonomic armrest of claim 1, wherein the first metal layer comprises aluminum and is approximately 3.2 millimeters thick.

8. An ergonomic armrest assembly, comprising:
   a front ergonomic armrest configured to be positioned adjacent to a front edge of a heat source; and
   at least one side ergonomic armrest configured to be positioned adjacent to a side edge of the heat source,
   wherein each of the ergonomic armrests comprises:
      an outer surface layer formed of a pliable electrostatic discharge (ESD)-safe material;
      a first metal layer configured to structurally support the outer surface layer and transfer heat from a first edge of the ergonomic armrest proximate to a heat source to a second edge of the ergonomic armrest opposite the heat source; and
      an insulating layer configured to reduce heat transfer from the heat source to the first metal layer.

9. The ergonomic armrest assembly of claim 8, wherein each of the ergonomic armrests further comprises:
   a second metal layer disposed on a side of the insulating layer opposite the first metal layer, the second metal layer configured to protect the insulating layer.

10. The ergonomic armrest assembly of claim 9, wherein each of the ergonomic armrests further comprises:
    a first adhesive layer disposed between the outer surface layer and the first metal layer;
    a second adhesive layer disposed between the first metal layer and the insulating layer; and
    a third adhesive layer disposed between the insulating layer and the second metal layer.

11. The ergonomic armrest assembly of claim 10, wherein at least one of the adhesive layers comprises an electrically conductive RTV (room temperature vulcanizing) adhesive configured to provide an electrical connection between its adjacent layers.

12. The ergonomic armrest assembly of claim 10, wherein an order of the layers of each ergonomic armrest is the outer surface layer, the first adhesive layer, the first metal layer, the second adhesive layer, the insulating layer, the third adhesive layer, and the second metal layer.

13. The ergonomic armrest assembly of claim 8, wherein a width of the insulating layer is less than 50% of a width of the outer surface layer.

14. The ergonomic armrest assembly of claim 8, wherein the first metal layer comprises aluminum and is approximately 3.2 millimeters thick.

15. An ergonomic hotplate workstation, comprising:
    a hotplate; and
    an ergonomic hotplate armrest disposed on a plurality of sides of the hotplate, each of the plurality of ergonomic hotplate armrests comprising:
       an outer surface layer formed of a pliable electrostatic discharge (ESD)-safe material;
       a first metal layer configured to structurally support the outer surface layer and transfer heat from a first edge of the ergonomic armrest proximate to the hotplate to a second edge of the ergonomic armrest opposite the hotplate; and
       an insulating layer configured to reduce heat transfer from the hotplate to the first metal layer.

16. The ergonomic hotplate workstation of claim 15, wherein each of the ergonomic hotplate armrests further comprises:
    a second metal layer disposed on a side of the insulating layer opposite the first metal layer, the second metal layer configured to protect the insulating layer.

17. The ergonomic hotplate workstation of claim 16, wherein each of the ergonomic hotplate armrests further comprises:
    a first adhesive layer disposed between the outer surface layer and the first metal layer;
    a second adhesive layer disposed between the first metal layer and the insulating layer; and
    a third adhesive layer disposed between the insulating layer and the second metal layer.

18. The ergonomic hotplate workstation of claim 17, wherein at least one of the adhesive layers comprises an electrically conductive RTV (room temperature vulcanizing) adhesive configured to provide an electrical connection between its adjacent layers.

19. The ergonomic hotplate workstation of claim 17, wherein an order of the layers of each ergonomic hotplate armrest is the outer surface layer, the first adhesive layer, the first metal layer, the second adhesive layer, the insulating layer, the third adhesive layer, and the second metal layer.

20. The ergonomic hotplate workstation of claim 15, wherein a width of the insulating layer is less than 50% of a width of the outer surface layer.

21. The ergonomic hotplate workstation of claim 15, wherein the first metal layer comprises aluminum and is approximately 3.2 millimeters thick.

\* \* \* \* \*